(12) United States Patent
Cronin et al.

(10) Patent No.: US 10,304,090 B2
(45) Date of Patent: May 28, 2019

(54) METHOD, APPARATUS AND COMPUTER PROGRAM PRODUCT FOR A COOKIE USED FOR AN INTERNET OF THINGS DEVICE

(71) Applicant: Nokia Technologies Oy, Espoo (FI)

(72) Inventors: John Cronin, Williston, VT (US);
Mike Kohonoski, Williston, VT (US);
Juha-Pekka Luoma, Tampere (FI);
Sami Majaniemi, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/885,107

(22) Filed: Oct. 16, 2015

(65) Prior Publication Data
US 2017/0109791 A1 Apr. 20, 2017

(51) Int. Cl.
*G06Q 30/02* (2012.01)
*H04L 29/06* (2006.01)
*H04L 29/08* (2006.01)

(52) U.S. Cl.
CPC ......... *G06Q 30/0267* (2013.01); *H04L 63/08* (2013.01); *H04L 67/146* (2013.01)

(58) Field of Classification Search
CPC .... G06Q 30/0267; H04L 67/146; H04L 63/08
See application file for complete search history.

(56) References Cited

U.S. PATENT DOCUMENTS

| | | | | |
|---|---|---|---|---|
| 8,166,406 B1* | 4/2012 | Goldfeder | ........... | G06F 21/6263 709/224 |
| 8,312,543 B1* | 11/2012 | Gardner | ............. | H04L 63/1416 726/22 |
| 9,646,095 B1* | 5/2017 | Gottlieb | ............ | G06F 17/30867 |
| 2001/0049620 A1* | 12/2001 | Blasko | .................. | G06Q 10/10 705/14.53 |

(Continued)

OTHER PUBLICATIONS

Bo, C. et al., *Web of Things-Based Remote Monitoring System for Coal Mine Safety Using Wireless Sensor Network*, International Journal of Distributed Senor Networks [online][retrieved Mar. 2, 2016]. Retrieved from the Internet: <URL: http://www.hindawi.com/journals/ijdsn/2014/323127/>. (2014) 9 pages.

(Continued)

*Primary Examiner* — Techane Gergiso
(74) *Attorney, Agent, or Firm* — Alston & Bird LLP

(57) ABSTRACT

Provided herein is a method, apparatus, and computer program product for a system to facilitate local communication between a plurality of portable personal devices and a third party entity using an internet of things. An apparatus may be provided including at least one processor and at least one memory including computer program code. The apparatus may be caused to: receive a cookie from a third party entity; compare the cookie to a database of trusted cookies; initiate a user interface for accepting or rejecting the cookie in response to the cookie not corresponding to a trusted cookie; receive a selection to either accept or reject the cookie; receive a security profile to apply to the cookie in response to the receiving a selection to accept the cookie; apply the security profile to the cookie; and store the cookie in the database of trusted cookies.

20 Claims, 16 Drawing Sheets

(56) References Cited

U.S. PATENT DOCUMENTS

| | | | |
|---|---|---|---|
| 2004/0002896 A1 | 1/2004 | Alanen et al. | |
| 2004/0199767 A1* | 10/2004 | Gross | H04L 63/102 713/168 |
| 2005/0257250 A1* | 11/2005 | Mitchell | G06F 21/6245 726/3 |
| 2006/0265495 A1* | 11/2006 | Butler | G06F 17/30899 709/224 |
| 2009/0024737 A1* | 1/2009 | Goldspink | G06F 11/3495 709/224 |
| 2012/0084151 A1* | 4/2012 | Kozak | G06Q 30/02 705/14.58 |
| 2012/0240050 A1* | 9/2012 | Goldfeder | G06F 21/6263 715/745 |
| 2013/0046619 A1 | 2/2013 | Translateur et al. | |
| 2014/0059696 A1 | 2/2014 | Parecki et al. | |
| 2014/0108131 A1* | 4/2014 | Smith | G06Q 30/0246 705/14.45 |
| 2014/0196153 A1* | 7/2014 | Schran | G06F 21/6263 726/26 |
| 2014/0215602 A1* | 7/2014 | Chuaprasort | G06Q 30/02 726/20 |
| 2014/0287723 A1 | 9/2014 | LaFever et al. | |
| 2014/0379496 A1* | 12/2014 | Smith | H04L 67/20 705/14.73 |
| 2015/0032539 A1* | 1/2015 | Smith | H04L 67/20 705/14.53 |
| 2015/0033312 A1 | 1/2015 | Seed et al. | |
| 2015/0149777 A1* | 5/2015 | Kim | H04L 63/0853 713/169 |

OTHER PUBLICATIONS

Microsoft IoT, *Boosting retail sales with IoT-powered customer engagement | Internet of Things* [online][retrieved Mar. 2, 2016]. Retrieved from the Internet: <URL: http://blogs.microsoft.com/iot/2015/01/12/boosting-retail-sales-with-iot-powered-customer-engagement/>. (Jan. 12, 2015) 6 pages.

Twining, Julianne, *The Internet of Things at CES | platform* [online][retrieved Mar. 2, 2016]. Retrieved from the Internet: <URL: https://www.ncta.com/platform/industry-news/the-internet-of-things-at-ces/>. (Jan. 9, 2015) 2 pages.

Extended European Search Report from corresponding European Patent Application No. 16193929.3 dated Mar. 14, 2017.

Sandeep Kumar Sood et al: "Inverse Cookie-Based Virtual Password Authentication Protocol", International Journal of Network Security, Sep. 1, 2011; pp. 98-108; XP055351186; Retrieved from the Internet: URL:http://ijns.femto.com.tw/contents/ijns-v13-n12/ijns-2011-v13-n2-p98-108.pdf [retrieved on Mar. 2, 2017].

Kalra Sheetal et al: "Secure Authentication Scheme for IoT and Cloud Servers"; Pervasive and Mobile Computing, Elsevier, NL, vol. 24, Aug. 11, 2015; pp. 210-223; XP029303971.

\* cited by examiner

IoT Device Cookie

| Element No. | Description | Sample Data |
|---|---|---|
| 1 | Cookie Source | Neiman |
| 2 | Target Device (MAC Address) | 01:23:45:67:89:ab |
| 3 | Date Issued (MMDDYYYY) | 01212015 |
| 4 | Expiration (days) | 365 |
| 5 | Path (Direct/Gateway) | Direct |
| 6 | Third Party Retailer Specific Identifier | Department123 |
| 7 | Secure Connection Required (1/0) | 1 |
| 8 | Comm Access Type (Bluetooth, WiFi, others) | Bluetooth |
| 9 | Retail Category | Menswear |
| 10 | Name | Smith,John |
| 11 | Email | jsmith@server.com |
| 12 | Age | 26 |
| 13 | Sex | Male |
| 14 | Home ZIP | 10014 |
| 15 | SecurityProfile | 1 |

FIG. 4

IoT Device Cookie Security Profiles

| Element No. | Description | Security Profile 1 | Security Profile 2 | Security Profile 3 |
|---|---|---|---|---|
| 1 | Cookie Source | YES | YES | YES |
| 2 | Target Device (MAC Address) | NO | NO | NO |
| 3 | Date Issued (MMDDYYYY) | YES | YES | YES |
| 4 | Expiration (days) | YES | YES | YES |
| 5 | Path (Direct/Gateway) | YES | YES | YES |
| 6 | Third Party Retailer Specific Identifier | YES | YES | YES |
| 7 | Secure Connection Required (1/0) | YES | YES | YES |
| 8 | Comm Access Type (Bluetooth, WiFi, others) | YES | YES | YES |
| 9 | Retail Category | YES | YES | YES |
| DEMOGRAPHIC COOKIE DATA ELEMENTS FOLLOW | | | | |
| 10 | Name | YES | NO | NO |
| 11 | Email | YES | NO | NO |
| 12 | Age | YES | YES | NO |
| 13 | Sex | YES | YES | NO |
| 14 | Home ZIP | YES | NO | NO |
| 15 | SecurityProfile | YES | YES | YES |

FIG. 5

| Third Party Entity Cookie Database ||||
|---|---|---|
| Cookie Number | Security Profile | Cookie Data (Concatenated Cookie Elements) |
| 1 | 3 | Neiman,Anon(MAC),01212015,365,Direct,Dept123,1,Bluetooth,Menswear,Anon(smith.john),Anon(jsmith@server.com),Anon(26),Anon(M),Anon(10014),3 |
| 2 | 1 | Macy,Anon(MAC),01232015,180,Direct,Dept456,1,Bluetooth,Jewelry,Smith.john,jsmith@server.com,26,M,10014,1 |
| 3 | 2 | Saks,Anon(MAC),01272015,90,Direct,DeptA,1,Bluetooth,SportingGoods,Anon(Smith.john),Anon(jsmith@server.com),26,M,Anon(10014),3 |
| N | 1 | Retailer,Anon(MAC),MMDDYYYY,Path,Ident,Connection,Access,RetailCategory,Name,Email,Age,Sex,Home ZIP,1 |

| Whitelist Cookie Database | | | |
|---|---|---|---|
| Cookie Number | Status | Cookie Source | Third Party Retailer Specific ID |
| 1 | White | Neiman | Menswear |
| 2 | White | Neiman | Ladieswear |
| 3 | White | Macy | Jewelry |
| 4 | Black | Macy | Home |
| 5 | White | Saks | SportingGoods |
| 6 | White | Saks | Seasonal |
| 7 | Black | Saks | Dresses |
| N | Black | Target | SpecificID |

Customer Profile Database

| Profile Number | Customer Identifier | Cookie Elements | Accepted/Rejected |
|---|---|---|---|
| 1 | Anon(MAC) | Neiman,Anon(MAC),01212015,365,Direct,Dept123,1,Bluetooth,Mensw ear,Anon(smithjohn),Anon(smith@server.com),Anon(26),Anon(M),Anon(10014),3 | Accepted |
| 2 | Anon(MAC) | Macy,01.02.03.04:05:ab,01232015,180,Direct,Dept456,1,Bluetooth, Jewelry,Smithjohn,jsmith@server.com,26,M,10014,1 | Accepted |
| 3 | Anon(MAC) | Saks,Anon(MAC),01212015,90,Direct,DeptA,1,Bluetooth, SportingGoods,Anon(smithjohn),Hash(jsmith@server.com),26,M,Anon(10014),2 | Accepted |
| N | Anon(MAC) | Retailer,XX:XX:XX:XX:XX:XX,MM/DD/YYYY,Path,Ident,Connection,Access, RetailCategory,Name,Email,Age,Sex,HomeZIP,1 | No Response |

FIG. 8

METHOD, APPARATUS AND COMPUTER PROGRAM PRODUCT FOR A COOKIE USED FOR AN INTERNET OF THINGS DEVICE

TECHNICAL FIELD

Example embodiments of the present invention relate generally to local, near-field communication, and more particularly, to an internet of things, where communication is facilitated between a plurality of portable personal devices and third party retailer point-of-sale systems.

BACKGROUND

The modern communications era has brought about a tremendous expansion of wireline and wireless networks. Computer networks, television networks, and telephony networks are experiencing an unprecedented technological expansion fueled by consumer demands. Together with these expanding network capabilities and communication speeds, the devices that use these networks have experienced tremendous technological steps forward in capabilities, features, and user interface technology. Devices communicating via these networks may be used for a wide variety of purposes including, among other things, Short Messaging Services (SMS), Instant Messaging (IM) service, E-mail, voice calls, music recording/playback, video recording/playback, and internet browsing. Such capabilities have made these devices part of everyday life for many people.

The ubiquity of devices that are ever-present in daily life offers opportunities to use these devices for capabilities beyond that which has already been established. These devices include vast amounts of information about their users, and some of that information may be used to provide useful content to the user, often in a customized, unique fashion that users may find particularly beneficial.

BRIEF SUMMARY

In general, example embodiments of the present invention provide a method, apparatus, and computer program product for a system to facilitate local communication between a plurality of portable personal devices and a third party entity using an internet of things, and more specifically, to using a device cookie for an internet of things device. An apparatus may be provided including at least one processor and at least one memory including computer program code. The at least one memory and the computer program code configured to, with the at least one processor, cause the apparatus to at least: receive a cookie from a third party entity; compare the cookie to a database of trusted cookies; initiate a user interface for accepting or rejecting the cookie in response to the cookie not corresponding to a trusted cookie; receive a selection to either accept or reject the cookie; receive a security profile to apply to the cookie in response to the receiving a selection to accept the cookie; apply the security profile to the cookie; and store the cookie in the database of trusted cookies.

According to some embodiments, the apparatus may, in response to receiving the selection to accept the cookie, be caused to send an updated cookie to the third party entity, and receive a message from the third party entity. The message from the third party entity may include information responsive to at least one item of information contained in the updated cookie. The third party entity may be a retail store, and the message from the retail store may include an incentive to purchase a product. The cookie may include an identifier of the retail store and at least one identifier of a location within the retail store. The incentive to purchase a product may be based, at least in part, on the location within the retail store. In response to the cookie corresponding to a trusted cookie, the apparatus may be caused to provide for an audible alert based on the third party entity.

Embodiments may provide a method that includes: receiving a cookie from a third party entity; comparing the cookie to a database of trusted cookies; initiating a user interface for accepting or rejecting the cookie in response to the cookie not corresponding to a trusted cookie; receiving a selection to either accept or reject the cookie; receiving a security profile to apply to the cookie in response to receiving the selection to accept the cookie; applying the security profile to the cookie; and storing the cookie in the database of trusted cookies.

According to some embodiments, methods may include, in response to receiving the selection to accept the cookie, sending an updated cookie to the third party entity, and receiving a message from the third party entity. The message from the third party entity may include information responsive to at least one item of information contained in the updated cookie. The third party entity may be a retail store, and the message from the retail store may include an incentive to purchase a product. The cookie may include an identifier of the retail store and at least one identifier of a location within the retail store. The incentive to purchase a product may be based, at least in part, on the location within the retail store. In response to the cookie corresponding to a trusted cookie, methods may include providing an audible alert based on the third party entity.

Embodiments may include a computer program product having at least one non-transitory computer-readable storage medium having computer-executable program code instructions stored therein. The computer-executable program code instructions may include: program code instructions for receiving a cookie from a third party entity; program code instructions for comparing the cookie to a database of trusted cookies; program code instructions for initiating a user interface for accepting or rejecting the cookie in response to the cookie not corresponding to a trusted cookie; program code instructions for receiving a selection to either accept or reject the cookie; program code instructions for receiving a security profile to apply to the cookie in response to receiving the selection to accept the cookie; program code instructions for applying the security profile to the cookie; and program code instructions for storing the cookie in the database of trusted cookies.

According to some embodiments, the computer program product may include, in response to receiving the selection to accept the cookie, program code instructions for sending an updated cookie to the third party entity, and program code instructions for receiving a message from the third party entity. The message from the third party entity may include information responsive to at least one item of information contained in the updated cookie. The third party entity may be a retail store, and the message from the retail store may include an incentive to purchase a product. The cookie may include an identifier of the retail store and at least one identifier of a location within the retail store. The incentive to purchase a product may be based, at least in part, on the location within the retail store.

BRIEF DESCRIPTION OF THE DRAWINGS

Figure 1:
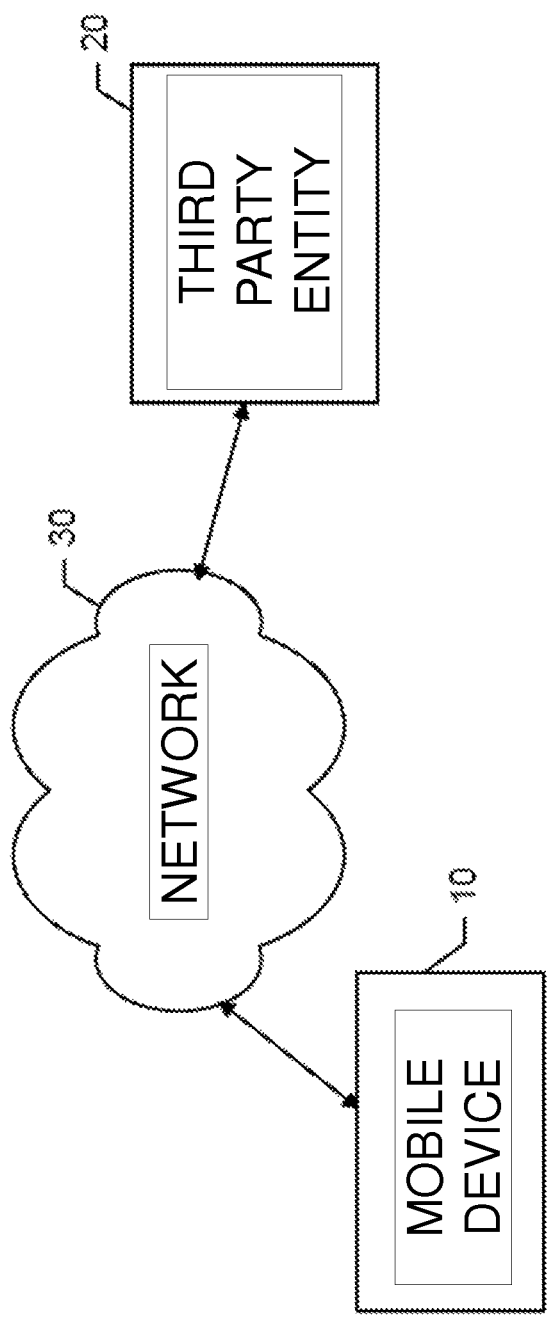
Figure 2:
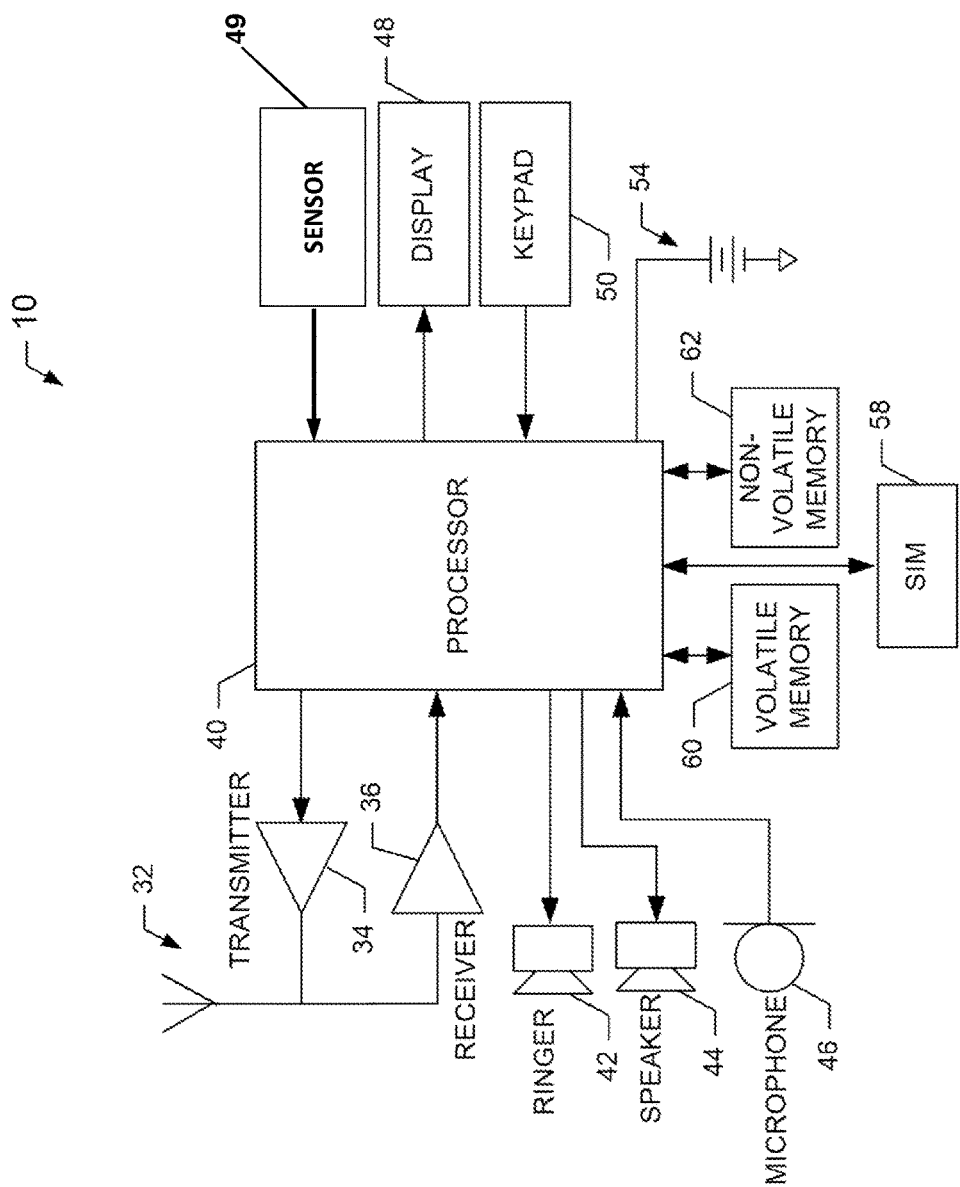
Figure 3:
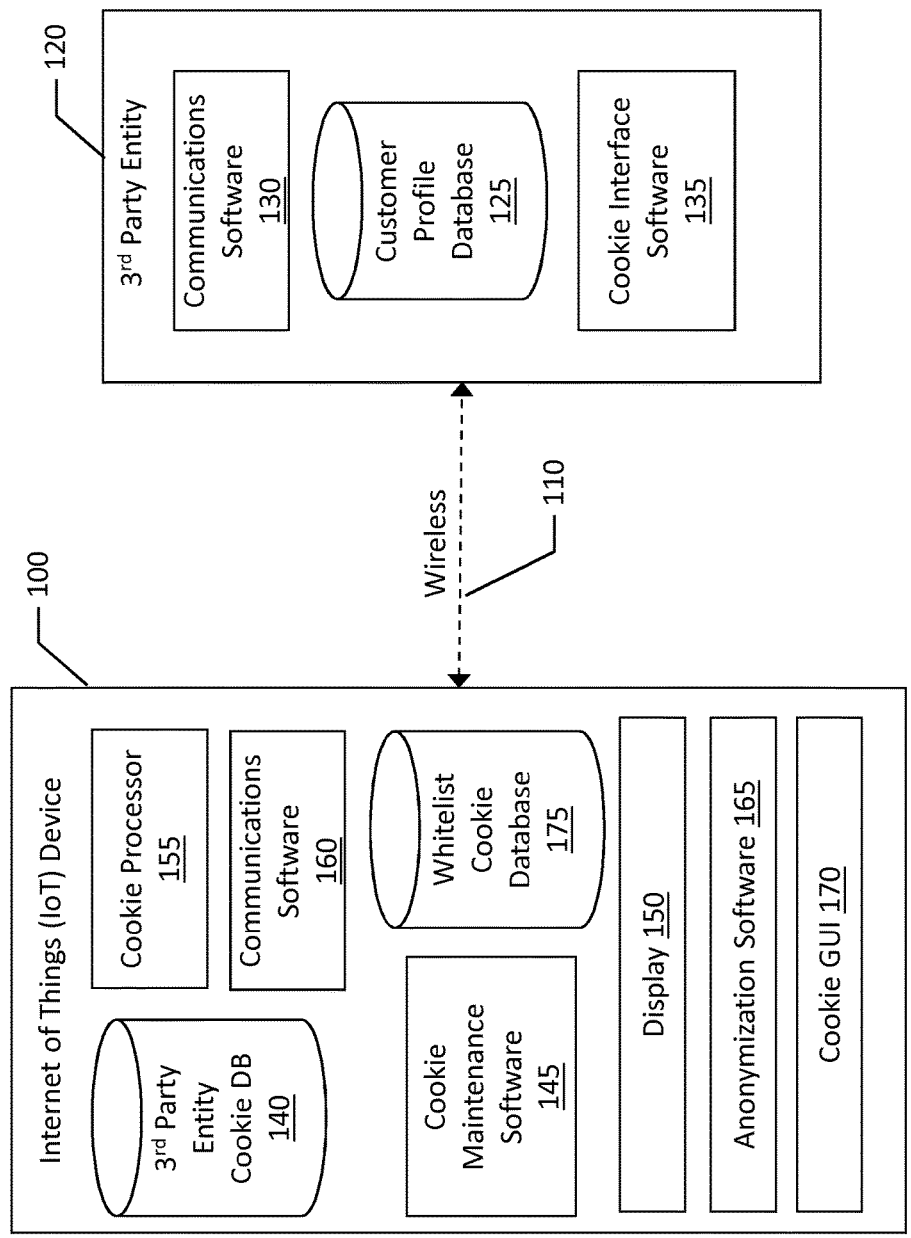
Figure 9:
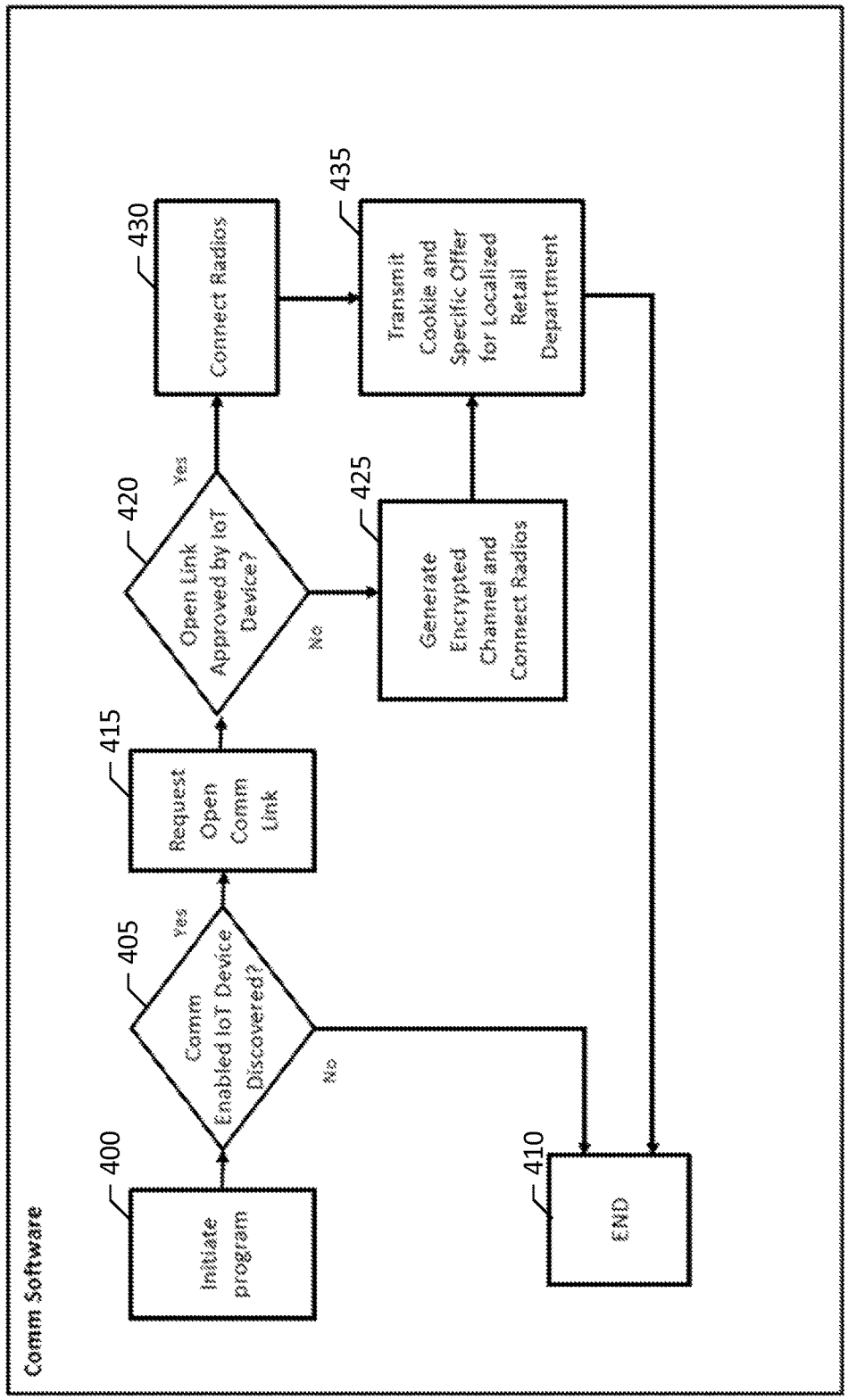
Figure 10:
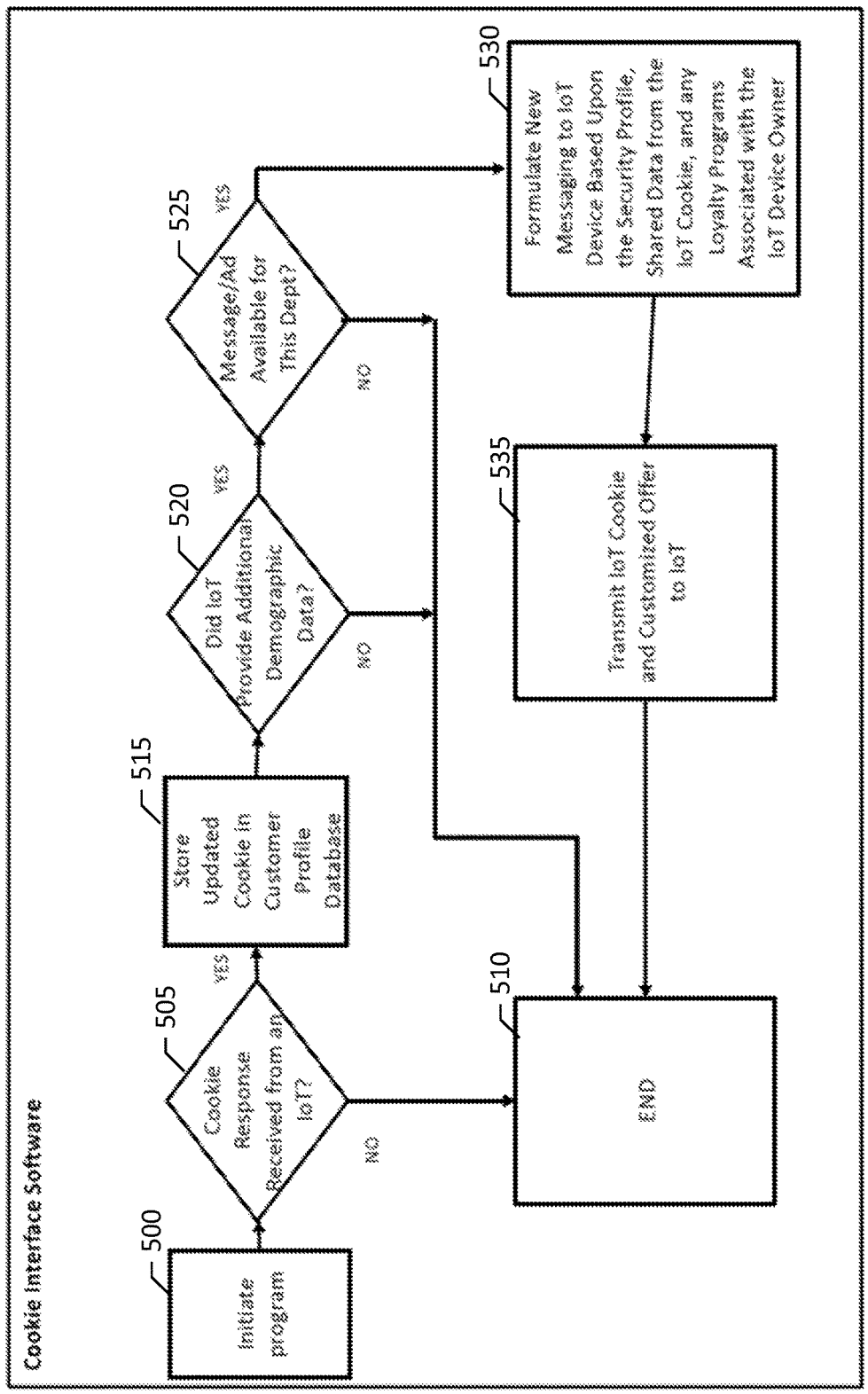
Figure 11:
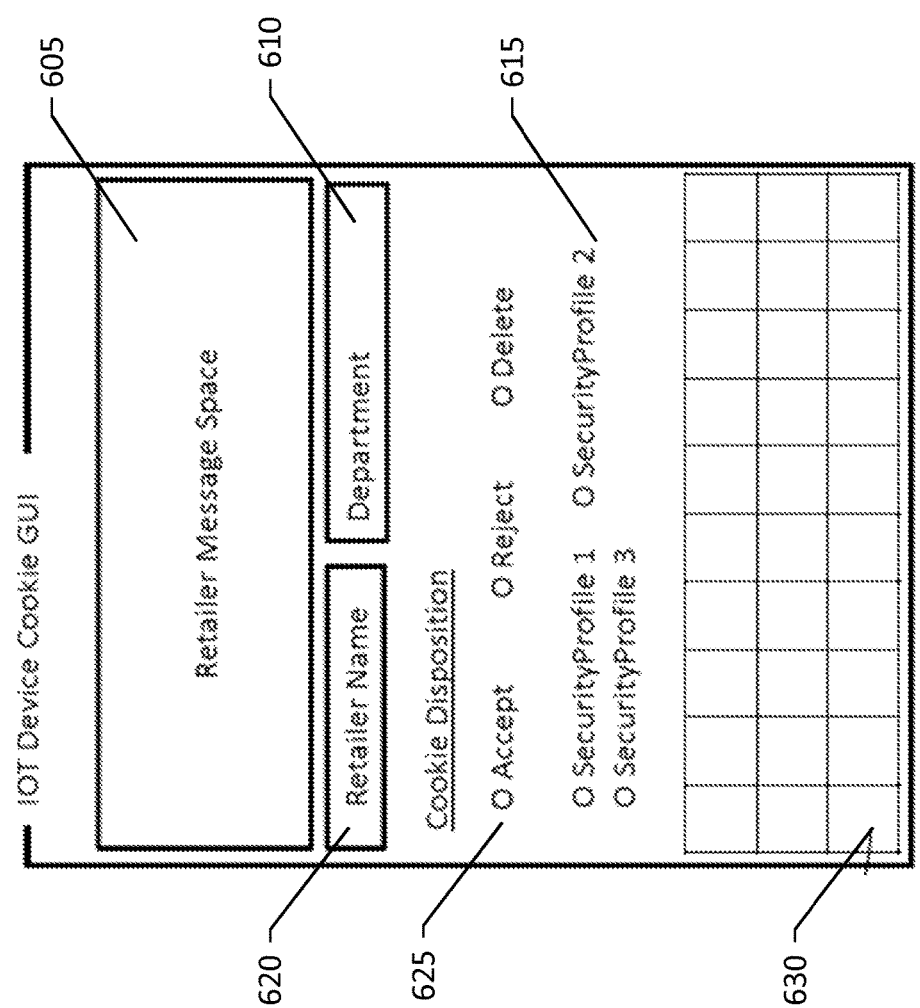
Figure 12:
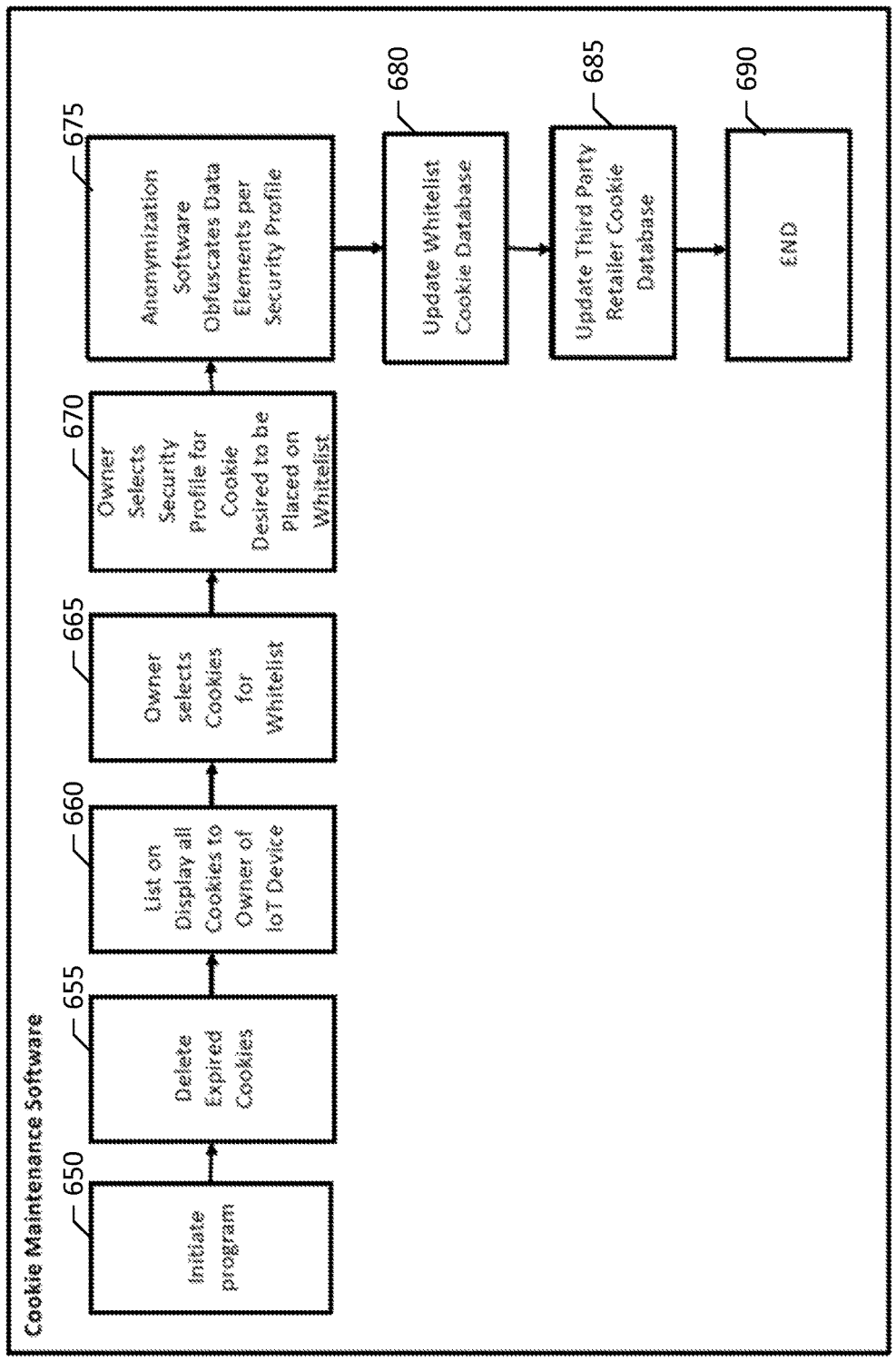
Figure 13:
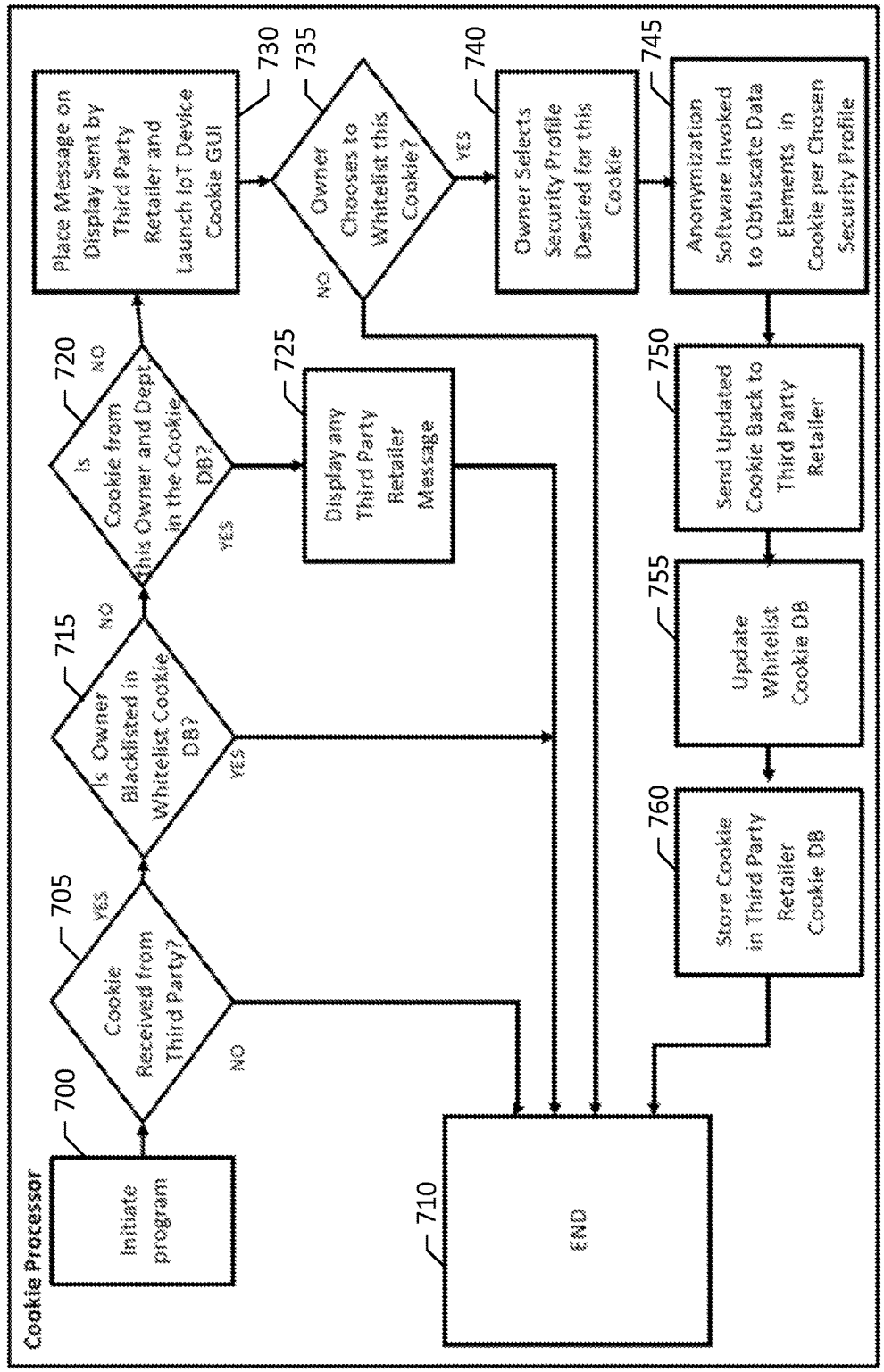
Figure 14:
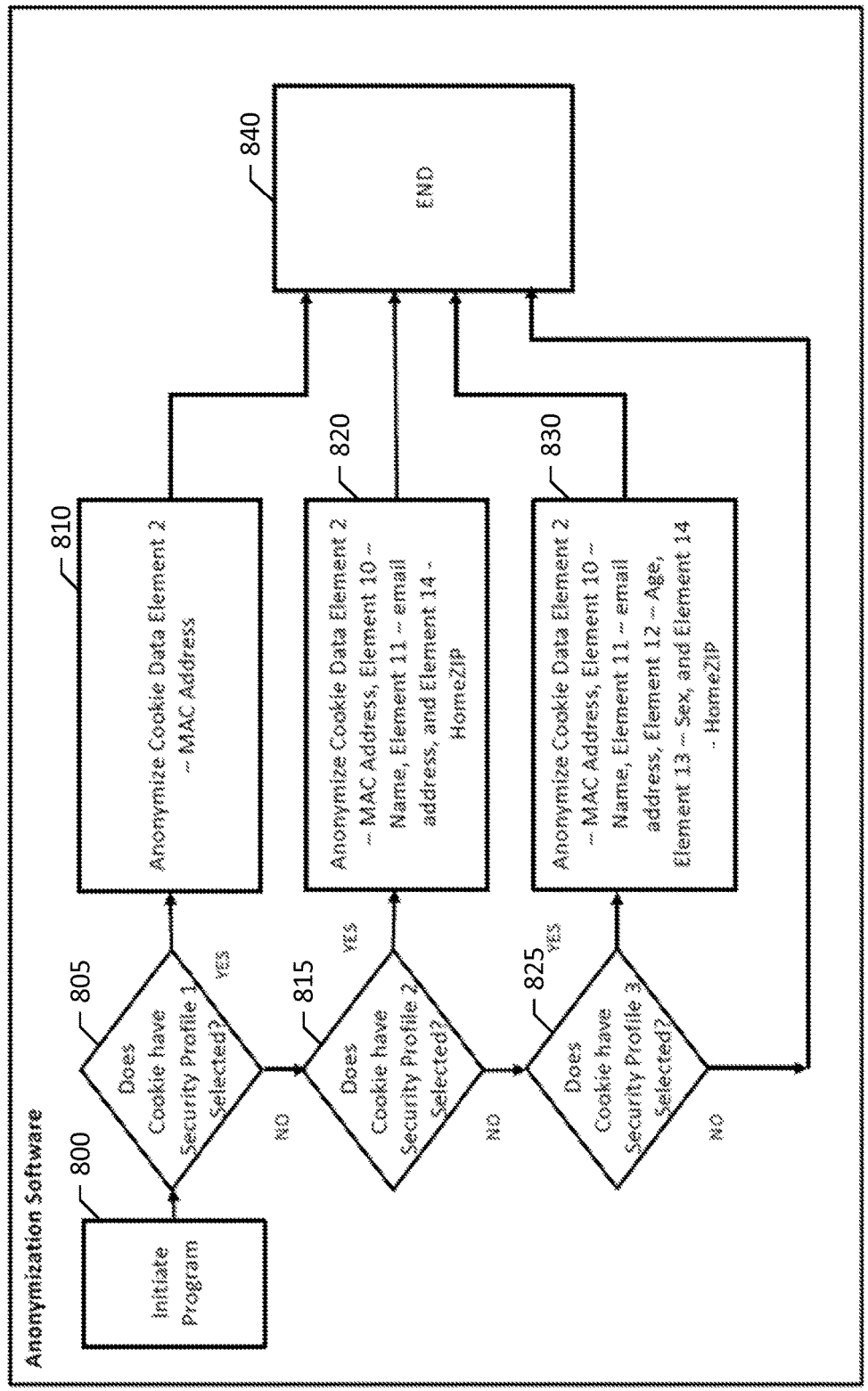
Figure 15:
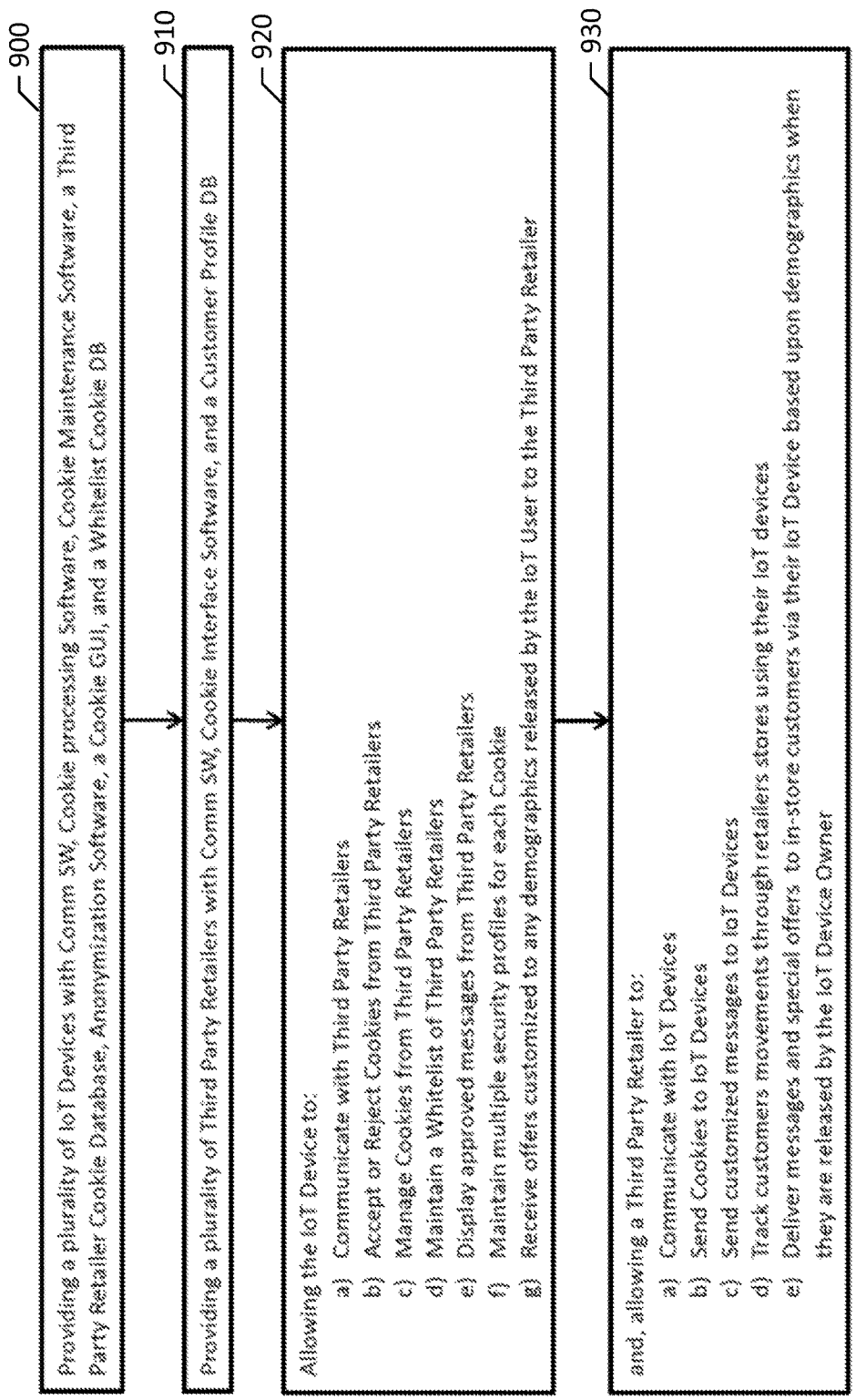
Figure 16:
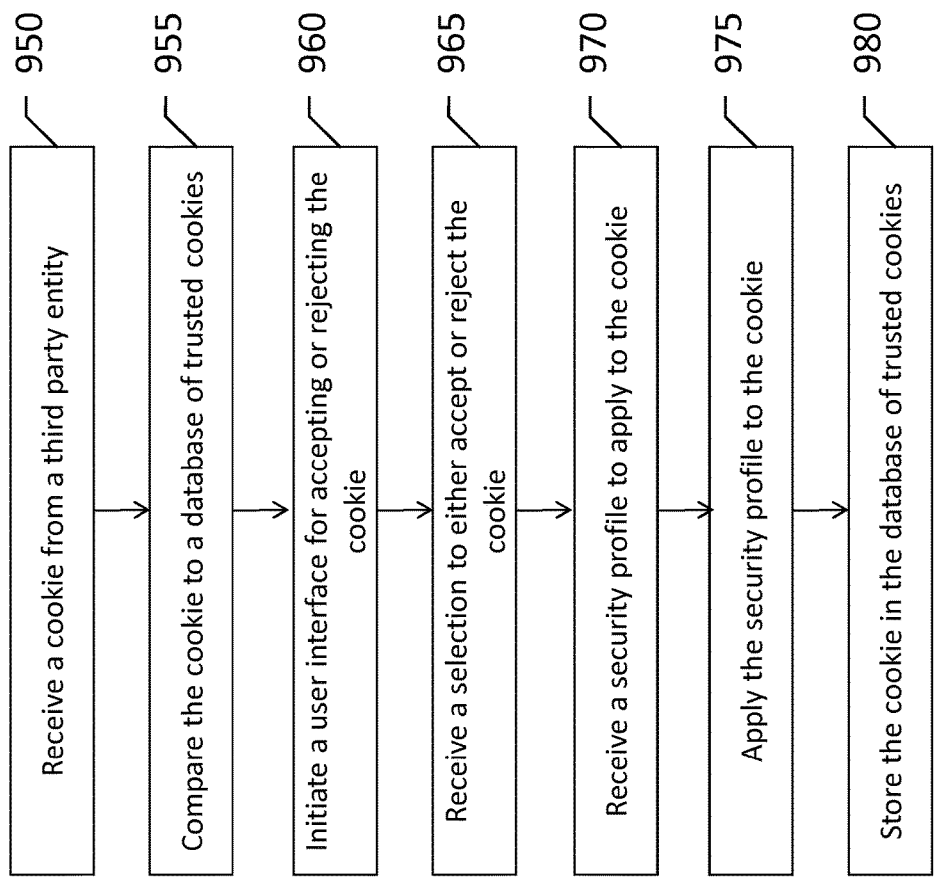

Having thus described example embodiments of the invention in general terms, reference will now be made to the accompanying drawings, which are not necessarily drawn to scale, and wherein:

FIG. 1 illustrates a mobile device and third party entity in accordance with an example embodiment of the present invention;

FIG. 2 is a schematic block diagram of a mobile device according to an example embodiment of the present invention;

FIG. 3 is a block diagram of a system for implementing a device cookie for an internet of things device according to an example embodiment of the present invention;

FIG. 4 is a depiction of an internet of things device cookie data structure according to an example embodiment of the present invention;

FIG. 5 is a depiction of an internet of things device cookie security profile data structure according to an example embodiment of the present invention;

FIG. 6 is a depiction of a third party entity cookie database data structure according to an example embodiment of the present invention;

FIG. 7 is a depiction of a whitelist cookie database data structure according to an example embodiment of the present invention;

FIG. 8 is a depiction of a customer profile database data structure according to an example embodiment of the present invention;

FIG. 9 is a flowchart of a method for operating communication software of an internet of things third party entity according to an example embodiment of the present invention;

FIG. 10 is a flowchart of a method of operating cookie interface software of an internet of things third party entity according to an example embodiment of the present invention;

FIG. 11 is an illustration of a graphical user interface for an internet of things device according to an example embodiment of the present invention;

FIG. 12 is a flowchart of a method of operating cookie maintenance software of an internet of things device according to an example embodiment of the present invention;

FIG. 13 is a flowchart of a method of operating a cookie processor of an internet of things device according to an example embodiment of the present invention;

FIG. 14 is a flowchart of a method of operating anonymization software of an internet of things device according to an example embodiment of the present invention;

FIG. 15 is a flowchart of a method of operating a device cookie for an internet of things device according to an example embodiment of the present invention; and FIG. 16 is a flowchart of another method of operating a device cookie for an internet of things device according to an example embodiment of the present invention.

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Example embodiments described herein may include a mobile device which is operable on a network for communicating with, for example, a third party entity which may include a retailer point-of-sale system in a retail environment. The mobile device 10 may be in communication with the third party entity 20 through a session supported by a network 30, as shown in FIG. 1. The network may include a collection of various different nodes, devices or functions that may be in communication with each other via corresponding wired and/or wireless interfaces or in ad-hoc networks such as those functioning over Bluetooth®. As such, FIG. 1 should be understood to be an example of a broad view of certain elements of a system that may incorporate example embodiments of the present invention and not an all inclusive or detailed view of the system or the network 30. Although not necessary, in some example embodiments, the network 30 may be capable of supporting communication in accordance with any one or more of a number of first-generation (1G), second-generation (2.G), 2.5G, third-generation (3G), 3.5G, 3.9G, fourth-generation (4G) mobile communication protocols and/or the like. However, according to some embodiments, particularly within a retail environment, the communication method may include near-field communications such as via Bluetooth®, Zigbee, Bluetooth Low Energy (BLE), radio frequency (RF), WiFi protocols, etc. Such near-field communications methods may be useful in environments where a 3G or 4G signal may be weak or unreliable.

One or more communication terminals such as the mobile device 10 and the third party entity 20 may be in communication with each other via the network 30 and each may include an antenna or antennas for transmitting signals to and for receiving signals from a base site, which could be, for example a base station that is part of one or more cellular or mobile networks or an access point that may be coupled to a data network, such as a local area network (LAN), a metropolitan area network (MAN), and/or a wide area network (WAN), such as the Internet. In turn, other devices (e.g., personal computers, server computers or the like) may be coupled to the mobile device 10 and the third party entity 20 via the network 30. By directly or indirectly connecting the mobile device 10 and the third party entity 20 and other devices to the network 30, the mobile device 10 and the third party entity 20 may be enabled to communicate with the other devices or each other, for example, according to numerous communication protocols including Hypertext Transfer Protocol (HTTP) and/or the like, to thereby carry out various communication or other functions of the mobile device 10 and the third party entity 20, respectively.

In example embodiments, the third party entity 20 may include one or more mobile or fixed communication devices. Thus, for example, the third party entity 20 could be, or be substituted by, any of personal computers (PCs), personal digital assistants (PDAs), wireless telephones, desktop computers, laptop computers, mobile computers, cameras, video recorders, audio/video players, positioning devices, game devices, television devices, radio devices, or various other devices or combinations thereof.

Although the mobile device 10 may be configured in various manners, one example of a mobile device that could benefit from embodiments of the invention is depicted in the block diagram of FIG. 2. While several embodiments of the mobile device may be illustrated and hereinafter described for purposes of example, other types of mobile devices, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communication devices, may employ embodiments of the present invention. As described, the mobile device may include various means for performing one or more functions in accordance with embodiments of the present invention, including those more particularly shown and described herein. It should be understood, however, that a mobile device may include alternative means for performing one or more like functions, without departing from the spirit and scope of the present invention.

The mobile device 10 may, in some embodiments, be a computing device configured to employ an example embodiment of the present invention. However, in some embodiments, the mobile device may be embodied as a chip or chipset. In other words, the mobile terminal may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The mobile device may therefore, in some cases, be configured to implement an embodiment of the present invention on a single chip or as a single "system on a chip." As such, in some cases, a chip or chipset may constitute means for performing one or more operations for providing the functionalities described herein.

The mobile device 10 illustrated in FIG. 2 may include an antenna 32 (or multiple antennas) in operable communication with a transmitter 34 and a receiver 36. The mobile device may further include a processor 40 that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile device may be capable of operating with one or more air interface standards, communication protocols, modulation types, and access types. By way of illustration, the mobile device may be capable of operating in accordance with any of a number of first, second, third and/or fourth-generation communication protocols or the like. For example, the mobile device may be capable of operating in accordance with second-generation (2G) wireless communication protocols IS-136, GSM and IS-95, or with third-generation (3G) wireless communication protocols, such as UMTS, CDMA2000, wideband CDMA (WCDMA) and time division-synchronous CDMA (TD-SCDMA), with 3.9G wireless communication protocols such as E-UTRAN (evolved-UMTS terrestrial radio access network), with fourth-generation (4G) wireless communication protocols or the like.

It is understood that the apparatus may include circuitry implementing, among others, audio and logic functions of the mobile device 10. The processor may be embodied in a number of different ways. For example, the processor may be embodied as various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like), a hardware accelerator, and/or the like.

In an example embodiment, the processor 40 may be configured to execute instructions stored in the memory device 60 or otherwise accessible to the processor 40. Alternatively or additionally, the processor 40 may be configured to execute hard coded functionality. As such, whether configured by hardware or software methods, or by a combination thereof, the processor 40 may represent an entity (e.g., physically embodied in circuitry) capable of performing operations according to an embodiment of the present invention while configured accordingly. Thus, for example, when the processor 40 is embodied as an ASIC, FPGA or the like, the processor 40 may be specifically configured hardware for conducting the operations described herein. Alternatively, as another example, when the processor 40 is embodied as an executor of software instructions, the instructions may specifically configure the processor 40 to perform the algorithms and/or operations described herein when the instructions are executed. However, in some cases, the processor 40 may be a processor of a specific device (e.g., a mobile device or network device) adapted for employing an embodiment of the present invention by further configuration of the processor 40 by instructions for performing the algorithms and/or operations described herein. The processor 40 may include, among other things, a clock, an arithmetic logic unit (ALU) and logic gates configured to support operation of the processor 40.

The mobile device 10 may also comprise a user interface including an output device such as an earphone or speaker 44, a ringer 42, a microphone 46, a display 48, and a user input interface, which may be coupled to the processor 40. The user input interface, which allows the mobile terminal to receive data, may include any of a number of devices allowing the mobile terminal to receive data, such as a keypad 50, a touch sensitive display (not shown) or other input device. In embodiments including the keypad, the keypad may include numeric (0-9) and related keys (#, *), and other hard and soft keys used for operating the mobile terminal 10. Alternatively, the keypad may include a conventional QWERTY keypad arrangement. The keypad may also include various soft keys with associated functions. In addition, or alternatively, the mobile terminal may include an interface device such as a joystick or other user input interface. The mobile terminal may further include a battery 54, such as a vibrating battery pack, for powering various circuits that are used to operate the mobile device, as well as optionally providing mechanical vibration as a detectable output. The mobile device 10 may also include a sensor 49, such as an accelerometer, motion sensor/detector, temperature sensor, or other environmental sensor to provide input to the processor indicative of a condition or stimulus of the mobile device 10, or the cargo to which the mobile device may be attached and/or associated.

The mobile device 10 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile device may be equipped with memory. For example, the mobile device may include volatile memory 60, such as volatile Random Access Memory (RAM) including a cache area for the temporary storage of data. The mobile device may also include other non-volatile memory 62, which may be embedded and/or may be removable. The non-volatile memory may additionally or alternatively comprise an electrically erasable programmable read only memory (EEPROM), flash memory or the like. The memories may store any of a number of pieces of information, and data, used by the mobile device to implement the functions of the mobile device. For example, the memories may include an identifier, such as an international mobile equipment identification (IMEI) code, capable of uniquely identifying the mobile device. Furthermore, the memories may store instructions for determining cell id information. Specifically, the memories may store an application program for execution by the processor 40, which determines an identity of the current cell, i.e., cell id identity or cell id information, with which the mobile device is in communication.

Devices such as mobile device 10 are capable of many useful function beyond conventional cellular telephone calls, and may be used as devices within an "internet of things." The internet of things (IoT) is a network of physical objects or "things" embedded with at least a communication interface such that the "things" can be communicated with via a network, such as network 30 of FIG. 1. The "things" of the IoT may further include electronics with software, sensors, and various other features that provide a useful function within the IoT. The devices in communication via the IoT may provide integration between physical objects and their environment with computer-based systems. According to various embodiments described herein, mobile device 10 may be integrated into the IoT to benefit from other devices on the IoT.

Mobile devices 10 often contain various types of information related to a user that may require varying degrees of privacy. User information stored, for example, in memory 60, 62 of the mobile device may include user identifying information, user contact information, personal information, etc. Further, the user's use history of a device may be considered private information, such as email communication, communication over the Internet (e.g., forms of payment, personal information entered on a website, etc.), the use of applications, location tracking, etc. Thus, mobile devices may include information about a user that the user wishes to safeguard against widespread distribution. While integrating a mobile device 10 into an internet of things may provide benefits to the user of the mobile device, such integration may raise substantial privacy concerns for a user of the device. Mobile device 10 users generally desire control over how and when their personal information is shared, and they may be willing to share various levels of information concerning themselves in return for a realized benefit, such as financial gain or cost avoidance.

Third party entities, such as third party entity 20 of FIG. 1, often have a desire to interact with all types of IoT devices, including being able to control access to IoT device data and provide features to a user of an IoT device that may benefit both the third party entity and the user of the device. For example, a third party entity may be a retailer point-of-sale system, and the third party entity may wish to communicate with IoT devices based on information from those IoT devices to provide discounts and incentives to the user of the IoT device to encourage purchases resulting in increased revenue for the third party entity.

Example embodiments provide a method for a user of a mobile device to grant permission for certain third party entities to interact with their mobile device as part of an IoT where an IoT Cookie is placed on that user's mobile device for use by both the user of the mobile device and the third party entity. As part of the cookie structure, there may be security levels that can be set by the owner of the mobile device that enable the third party entity access to various levels of personal information. In this manner, control is given to the user of the mobile device as to what information may be shared with the third party entity.

Cookies are widely known for browser communications that have multiple and varied options, such as whether to store a cookie or not, whether to allow certain links to be saved (for instance, HTTPS: links would not be stored). According to conventional web-based use, cookies are small pieces of information sent by websites for storing in a user's web browser so that it can be read back from that browser at a later time. This enables a web browser to recall information on a website, and the website may recognize the browser which may improve the efficiency and user experience with a website. Embodiments described herein provide a non-browser and non-internet based communications cookie system for IoT devices or mobile devices operating on an IoT as an IoT device.

FIG. 3 illustrates a system for implementing an IoT device cookie according to an example embodiment of the present invention. The IoT device cookie system of the illustrated embodiment includes two primary components: an internet of things (IoT) device 100; and a wireless communication link 110 with a third party entity 120. The third party entity 120 of the illustrated embodiment may be a retailer with a point-of-sale system for tracking customer actions and to store customer data, such as in customer profile database 125. As such, according to some example embodiments described herein the third party entity 120 may be referenced as a "third party retailer." The IoT device 100 may include a third party entity cookie database 140, cookie maintenance software 145, display 150, cookie processor 155, communications software 160, anonymization software 165, cookie graphic user interface 170, and whitelist cookie database 175, each of which will be described further below. The IoT device 100 includes communication software 160 for communication with the cookie processor 155 such that cookies can be analyzed in response to their receipt from a third party entity, such as third party entity 120. Additionally, a third party entity cookie database 140 can be implemented such that any cookies received can be stored at the direction of a user.

Cookie maintenance software 145 may enable a user of the IoT device to manage cookies, such as by adding the third party entity 120 to the whitelist cookie database 175, accept, reject, or delete a cookie, or set a security profile for the cookie. The whitelist cookie database may include a database of cookies that have been accepted or approved by a user. This enables a user to receive cookies from a third party entity given the terms and conditions set by the IoT device user. Embodiments described herein enable a multitude of maintenance options for cookies unlike web browser related cookie systems.

The third party entity 120 may include communications software 130 for communicating wirelessly with the communications software 160 of the IoT device 100, cookie interface software 135, and customer profile database 125 to store pertinent customer data and possible retail offering information for the customer based upon various criteria. The retail offering information may be based, for example, on a customer's purchase history, their location within a retail environment, the time of day, time of year, or any other information that may be gleaned from the information permitted by a user to be accessed by the third party entity 120. The cookie interface software may process the cookies that may be uploaded to the IoT device.

A basic component for using a mobile terminal as a device in an IoT network according to examples provided herein is the device cookie that will be used to govern communication between the IoT device and the third party entity. FIG. 4 illustrates an example data structure for an IoT device cookie architecture. This cookie architecture may provide data elements that can be used by the IoT device owner and the third party entity, shown as elements 1-8. Element 1 is illustrated as the cookie source, where the sample data is the name "Neiman" suggesting the third party entity from which the cookie was received. Element 2 is the target device media access control (MAC) address which is represented in the sample data in the form of 12 hexadecimal digits that uniquely identify the IoT device. Element 3 is the date of issue of the cookie with the sample data being a date in the format specified. This is the date that the cookie was placed in the IoT device by the cookie source. Element 4 includes an expiration for the cookie in the unit specified. In the embodiment of FIG. 4, the unit of measure is days, and the sample is 365, such that the cookie is set to expire 365 days after issue. Element 5 is a path identifying whether the cookie is received directly or through a gateway. This allows for the potential that a cookie received may not be placed on the IoT device directly as shown in FIG. 3, but may be received through a gateway. Element 6 specifies the third party entity identifier, as the cookie source may not be specific enough. According to the embodiment of FIG. 4, the third party entity identifier is "Department123". This may be the location or department of a retailer where the retailer actually communicated with the IoT device. For example, walking through Neiman Marcus and going through the men's department, a cookie received may be identified specifically as received in the men's department of the store. Element 7 describes the type of connection required for the IoT communications, such as secure or open. This may be established, at least in part, based on the type of information exchanged between the IoT device and the third party entity. Element 8 may describe the communication access type, such as Bluetooth®, WiFi, Zigbee™, etc.

According to some embodiments described herein, additional data elements may be included in the IoT device cookie of FIG. 4. Element 9 may include a retail category, such as menswear, to further define the identity of the source of the cookie and to better inform information that may be exchanged with regard to the cookie. A user of an IoT device could accept or decline cookies based on the retail category, or any of the aforementioned elements. This enables a user to tailor a cookie to limit the communication between the IoT device and the third party entity to their specific wants. Elements 10-14 include information identifying the user of the IoT device. The information may include the name of the user (Element 10), an email address of the user (Element 11), an age of the user (Element 12), a gender of the user (Element 13), and a home zip code of the user (Element 14). Some cookies may include more or fewer elements related to the identification of a user, and the user may decide which of these elements they wish to share with the third party entity through a security profile, as described below.

Element 15 of the IoT device cookie of FIG. 4 displays a "security profile" for the user. This element may enable a user to select a security profile to be used with this particular cookie with this particular third party entity. For example, a user may establish one or more security profiles, where each may have a different level of access to various elements of information about the user of a mobile device on an IoT. The user may select a security profile for a cookie such that they do not need to separately establish security rules for the various aspects of information access requested by each cookie that is encountered.

FIG. 5 illustrates an example data structure for an IoT device cookie security profile that may be resident on the IoT device, stored for example in memory 62. The security profiles may be pre-defined, for example by a device manufacturer, and/or the security profiles may be user-defined. According to the illustrated embodiment, the target device MAC address may not be shared with a third party entity for user privacy. However, all remaining cookie data elements may be shared under the least secure and least restrictive security profile, which is "security profile 1" of the illustrated embodiment of FIG. 5. Security profile 2 is a more secure security profile in which name, email, and home zip code data, while an even more secure security profile may not share any demographic cookie data concerning the IoT device user.

FIGS. 6 and 7 illustrate an example data structure for an IoT cookie device that may be resident on the IoT device. FIG. 6 depicts the third party entity cookie database (140 of FIG. 3), while FIG. 7 depicts the whitelist cookie database (175 of FIG. 3). The third party entity cookie database of FIG. 6 includes a cookie number, cookie security profile, and cookie data (concatenated cookie elements). Each cookie that is placed on the IoT device may contain concatenated cookie elements, for example as shown in FIG. 5, Neiman with the MAC address and date in addition to how it was connected (e.g., Bluetooth), the department that the cookie was received from, the name of the IoT device user, the email address of the IoT device user, age and gender of the IoT device user, home zip code of the IoT device user, and the security profile assigned to the cookie. The user can assign security profiles individually upon receipt of the cookie, or the user can set a "default" security profile to assign to each cookie unless the user directs otherwise for a particular cookie.

The whitelist cookie database illustrated in FIG. 7 includes cookie number, status, cookie source, and the third party entity specific identification. For example, status refers to whether it is essentially white or black, white being acceptable to the user of the IoT device, and black meaning unacceptable. Further, the cookie source may be from any entity, such as Neimans, Macy's, Saks, Target, etc., with still further a finer identification down to the department within the store that generated the cookie. Multiple cookies can exist for any given cookie source.

FIG. 8 illustrates an example data structure for a third party entity. The third party entity may include a customer profile database, such as customer profile database 125 of FIG. 3, which may include a profile number, customer identifier, cookie elements, and accepted/rejected status. The illustrated database may be the customer profile database and may be located at the third party entity, containing one through N profiles that the entity would store. A unique customer identify may be the anonymized MAC address for the IoT device so that the retailer would not have a piece of personally identifiable information concerning the IoT device itself. The cookie elements may be identical to the cookie elements that would be stored at the IOT device, and may be concatenated from all of the elements in the database.

FIGS. 9, 10, and 12-16 are flowcharts illustrative of a systems, methods and program products according to example embodiments of the invention. The flowchart operations may be performed by a mobile terminal, such as mobile terminal 10 shown in FIG. 2, as operating over a communications network such as that shown in FIG. 1. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware), such as depicted in FIG. 2, to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

FIG. 9 depicts a flowchart of an example method of IoT device cookie, third party entity communications software. According to the illustrated method, IoT devices may be communicated with, such as over network 30, in order to obtain cookie data. The program may be initiated at 400 at which point a decision is made at 405 as to whether to communication is enabled to the IoT device discovered by the retailer. If communication to the IoT device is disabled, the process ends at 410. If communication to the IoT device is enabled, a request to open a communication link is sent to the IoT device at 415, which may be sent via wireless connection 110 using communications software 130. A decision is then required at 420 as to whether the communications link is approved at the IoT device, and if so, the communication means are connected at 430. The decision may be made by a user, such as using a user interface of the device 100, or the decision may be made automatically based on the whitelist cookie database 175. If the communications link is not approved, an encrypted channel is created via communications software 130 and the communication means are connected at 425. The communication means may be any of the aforementioned wireless communication protocols, such as Bluetooth®, WiFi, Zigbee, etc. Once the communication means are connected between the IoT device 100 and the third party entity 120, the cookie is transmitted from the third party entity and any specific offer for a localized retail department may also be sent at 435.

FIG. 10 illustrates a flowchart of an example method of operation of the cookie interface software 135 of the third party entity. According to the illustrated embodiment, a program is initiated at 500, followed by a decision at 505 as to whether a cookie response has been received from an IoT device. If no cookie response has been received, the process ends at 510. If a cookie response has been received, the updated cookie is stored in the customer profile database 125 of the third party entity 120. A decision may be made at 520 as to whether additional demographic information was provided by the IoT device in the cookie response. If not, the process ends at 510; however, if additional demographic information was provided by the IoT device, a decision may be made by the third party entity at 525, such as at a processor, as to whether there is a message, advertisement, coupon, discount, etc. available that is associated with the cookie response, such as with a retail store department identified by the cookie. If there is a message/advertisement/coupon/discount or other incentive available at 525, a message may be formulated to the IoT device based upon the security profile of the IoT device, the shared data from the cookie, and any loyalty programs that may be associated with the IoT device or IoT device user at 530. The customized offer may then be provided to the IoT device at 535.

FIG. 11 illustrates an example embodiment of an IoT device cookie graphical user interface (GUI) used by the IoT device and illustrated as 170 in FIG. 3. This GUI is provided to the IoT device user to make a decision for each cookie that is received by the IoT device. The GUI may include a retail message at 605, which may include a coupon, incentive, discount, or other communication from the retailer to the IoT device user. The retailer name and department may be provided at 620 and 610, respectively. The user may be provided an option to accept, reject, or delete the cookie at 625. At 615, the user of the IoT device may be given options as to which security profile to apply to the cookie if the cookie is to be accepted. If the cookie disposition is rejected or deleted, the retailer message may be deleted and the display cleared. A keyboard may be provided at 630 for entry of any additional information, such as if the user intends to set up a new security profile, or if they intend to provide a nickname for the cookie.

FIG. 12 illustrates a flowchart of an example method of the cookie maintenance software of the IoT device. According to some embodiments of the method described herein, an IoT device owner can manage cookies stored on their IoT device. The cookie maintenance software may be initiated at 650 and expired cookies may be deleted at 655. A list of all remaining cookies may be provided to the IoT device user, such as at display 48 of FIG. 2. The IoT device user may select which cookies are to be placed on the whitelist at 665, indicating that the selected cookies are approved by the user. The IoT device user may then select the security profile for each cookie that is placed on the whitelist at 670. At 675, anonymization software, shown in FIG. 3 as 165, may obfuscate data elements according to the selected profile, such as scrubbing demographic data from cookies for which the security profile requires a high level of privacy. At 680, the whitelist cookie database 175 may be updated. At 685, the third party entity cookie database 140 may be updated.

FIG. 13 illustrates a flowchart of an example method of operation of the cookie processor 155 of the IoT device 100. According to the illustrated method, the IoT device cookie processor 155 may respond to the retailer or third party entity 120 that is attempting to place a cookie on the IoT device with an updated cookie as an acceptance for the retailer to use in customizing any messaging or offers to the IoT device user. The method may include initiating the program at 700 and deciding if a cookie has been received from a third party entity at 705. If no cookie has been received, the method ends at 710. If a cookie has been received, a decision is made at 715 as to whether the third party entity is blacklisted in the whitelist cookie database, such as by comparing the cookie data against the whitelist cookie database 175. If the third party entity is blacklisted, the method ends. If the third party entity is not blacklisted, a decision is made at 720 to determine if the third party entity and department of the third party entity are in the cookie database 140. If so, the message from the third party entity may be displayed at 725. If the cookie is not from a third party entity and department in the cookie database, the IoT device cookie GUI may be launched at 730. The IoT device user may then determine if the cookie is to be added to the whitelist at 735, and if it is to be added, the security profile is selected at 740. The anonymization software may be invoked at 745 to obfuscate data elements in the cookie according to the selected security profile. The updated cookie may be returned to the third party entity at 750 to update the third party entity customer profile database 125 as shown at 760, and the whitelist cookie database may be updated at 755.

FIG. 14 depicts a flowchart of an example method of operation of the IoT device anonymization software shown in FIG. 3 as 165. In this method, the IoT device anonymization software may use randomized cookie data elements per the IoT device user's selected security profile for a cookie. Methods may include identifying whether the cookie has security profile 1 at 805. If the cookie is subject to security profile 1, the MAC address may be anonymized at 810, as this is the only element that is obfuscated in security profile 1. If the cookie is subject to security profile at 815, at 820 the MAC address, name, email address, and home zip code are anonymized. If the cookie is subject to security profile 3 at 825, at 830 the MAC address, name, email address, age, gender, and home zip code are anonymized.

FIG. 15 illustrates a flowchart of an example overall method of implementing an IoT device cookie. According to the illustrated method, a plurality of IoT devices may be provided with communication software 160, cooking processing software 155, cookie maintenance software 145, a third party entity cookie database 140, anonymization software 165, a cooki GUI 170, and a whitelist cookie database 175, as shown at 900. A plurality of third party entities may be provided with communication software 130, cookie interface software 135, and a customer profile database 125, as shown at 910. At 920, the IoT device is enabled to communicate with third party entities, accept or reject cookies from third party entities, manage cookies from third party entities, maintain a whitelist of third party entities, display approved messages from third party entities, maintain multiple security profiles for each cookie, and receive offers customized to any demographics released by the IoT device to the third party entity. The third party entity may be enabled, at 930, to communicate with IoT devices, send cookies to IoT devices, send customized messages to IoT devices, track customer movements through retail stores using the IoT devices, and deliver messages and special offers to in-store customers via their IoT devices based upon demographics that are released to the third party entity by the IoT device user in the cookie security profile.

FIG. 16 illustrates a method of implementing a device cookie on an internet of things device according to an example embodiment of the present invention. As illustrated, a cookie is received from a third party entity at 950. The cookie is compared to a database of trusted cookies at 955. In response to the cookie not corresponding to a trusted cookie, a user interface for accepting or rejecting the cookie is initiated at 960. A selection is received at 965 to either accept or reject the cookie. A security profile to apply to the cookie is received at 970 in response to receiving the selection to accept the cookie. The security profile may be applied at 975, and the cookie may be stored in the database of trusted cookies at 980.

In an example embodiment, an apparatus for performing the methods of FIGS. 9, 10, and 12-16 above may comprise a processor (e.g., the processor 40) configured to perform some or each of the operations described above. The processor may, for example, be configured to perform the operations by performing hardware implemented logical functions, executing stored instructions, or executing algorithms for performing each of the operations. Alternatively, the apparatus may comprise means for performing each of the operations described above. In this regard, according to an example embodiment, examples of means for performing the operations may comprise, for example, the processor 40 and/or a device or circuit for executing instructions or executing an algorithm for processing information as described above.

According to some embodiments described herein, offers made by retailers to the IoT devices could have additional context to further customize messages to a particular user. For example, if the security profile of a particular cookie allows demographic information to be used by the third party entity, the third party entity may be able to associate the user with a customer account, and messages may be tailored to the user based on that user's purchase history. If a user has a history of buying golf balls, for example, incentives may be offered for that user to purchase golf clubs.

The IoT device user may be able to prioritize the accepted cookies on their device such that only the cookies above a threshold priority may be presented in real-time, while other cookies may be able to be viewed at a later time, but are not immediately presented. Further, an IoT device user may be able to assign specific alert sounds to each third party entity such that when a cookie or offer is received at the IoT device, the user is immediately made aware of the cookie or offer, and the third party entity from which the cookie or offer came can be identified by the alert sound.

While the above-described examples primarily reflect the use of the IoT device cookies with respect to retail establishments, embodiments may be used similarly in a variety of environments. For example, cookies may be used in transportation, such as when a user is riding a bus, they may be alerted to a cookie for the transportation system running the bus, and the user may be provided with incentives to ride the bus more often, or to use alternate routes, etc.

As described above and as will be appreciated by one skilled in the art, embodiments of the present invention may be configured as a system, method or electronic device. Accordingly, embodiments of the present invention may be comprised of various means including entirely of hardware or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the at least one processor, cause the apparatus to at least perform:
   receive a cookie from a third party entity;
   compare the cookie to a database of trusted cookies;
   in response to the cookie not corresponding to a trusted cookie, initiate a user interface of a user device for accepting or rejecting the cookie;
   cause provision, via the user interface, of a plurality of security profiles stored on the user device, wherein the plurality of security profiles define different levels of access by the third party entity to various elements of data on the user device;
   in response to receiving a selection to accept the cookie, receive an indication of a user-selected security profile from the plurality of security profiles to apply to the cookie;
   apply the selected security profile to the cookie; and
   store the cookie in the database of trusted cookies.

2. The apparatus of claim 1, further comprising, in response to causing the apparatus to receive the selection to accept the cookie:
   causing the apparatus send an updated cookie to the third party entity; and
   causing the apparatus to receive a message from the third party entity.

3. The apparatus of claim 2, wherein the message from the third party entity comprises information responsive to at least one item of information contained in the updated cookie.

4. The apparatus of claim 3, wherein the third party entity is a retail store, and wherein the message from the retail store comprises an incentive to purchase a product.

5. The apparatus of claim 4, wherein the cookie comprises an identifier of the retail store and at least one identifier of a location within the retail store.

6. The apparatus of claim 5, wherein the incentive to purchase a product is based, at least in part, on the location within the retail store.

7. The apparatus of claim 1, wherein in response to the cookie corresponding to a trusted cookie, causing the apparatus to provide for an audible alert based on the third party entity.

8. A method comprising:
   receiving a cookie from a third party entity;
   comparing the cookie to a database of trusted cookies;
   initiating a user interface of a user device for accepting or rejecting the cookie in response to the cookie not corresponding to a trusted cookie;
   causing provision, via the user interface, of a plurality of security profiles stored on the user device, wherein the plurality of security profiles define different levels of access by the third party entity to various elements of data on the user device;
   receiving a selection to either accept or reject the cookie;
   in response to receiving a selection to accept the cookie, receiving an indication of a user-selected security profile from the plurality of security profiles to apply to the cookie;
   applying the selected security profile to the cookie; and
   storing the cookie in the database of trusted cookies.

9. The method of claim 8, further comprising, in response to receiving the selection to accept the cookie:
   sending an updated cookie to the third party entity; and
   receiving a message from the third party entity.

10. The method of claim 9, wherein the message from the third party entity comprises information responsive to at least one item of information contained in the updated cookie.

11. The method of claim 10, wherein the third party entity is a retail store, and wherein the message from the retail store comprises an incentive to purchase a product.

12. The method of claim 11, wherein the cookie comprises an identifier of the retail store and at least one identifier of a location within the retail store.

13. The method of claim 12, wherein the incentive to purchase a product is based, at least in part, on the location within the retail store.

14. The method of claim 8, wherein in response to the cookie corresponding to a trusted cookie, providing for an audible alert based on the third party entity.

15. A computer program product comprising at least one non-transitory computer-readable storage medium having computer-executable program code instructions stored therein, the computer-executable program code instructions comprising:
   program code instructions for receiving a cookie from a third party entity;
   program code instructions for comparing the cookie to a database of trusted cookies;
   program code instructions for initiating a user interface of a user device for accepting or rejecting the cookie in response to the cookie not corresponding to a trusted cookie;
   program code instructions for causing provision, via the user interface, of a plurality of security profiles stored on the user device, wherein the plurality of security profiles define different levels of access by the third party entity to various elements of data on the user device;

program code instructions for receiving a selection to either accept or reject the cookie;

program code instructions for, in response to receiving a selection to accept the cookie, receiving an indication of a user-selected security profile from the plurality of security profiles to apply to the cookie;

program code instructions for applying the security profile to the cookie; and program code instructions for storing the cookie in the database of trusted cookies.

16. The computer program product of claim 15, further comprising, in response to receiving the selection to accept the cookie:

program code instructions for sending an updated cookie to the third party entity; and program code instructions for receiving a message from the third party entity.

17. The computer program product of claim 16, wherein the message from the third party comprises information responsive to at least one item of information contained in the updated cookie.

18. The computer program product of claim 17, wherein the third party entity is a retail store, and wherein the message from the retail store comprises an incentive to purchase a product.

19. The computer program product of claim 18, wherein the cookie comprises an identifier of the retail store and at least one identifier of a location within the retail store.

20. The computer program product of claim 19, wherein the incentive to purchase a product is based, at least in part, on the location within the retail store.

* * * * *